United States Patent
Wang et al.

(10) Patent No.: US 9,781,616 B2
(45) Date of Patent: Oct. 3, 2017

(54) METHODS FOR DETERMINING A LOADING OF A WIRELESS COMMUNICATIONS SYSTEM AND COMMUNICATION APPARATUSES UTILIZING THE SAME

(75) Inventors: Chao-Chun Wang, Taipei (TW); Chih-Shi Yee, Hsinchu County (TW); James June-Ming Wang, San Marino, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 475 days.

(21) Appl. No.: 13/877,970

(22) PCT Filed: Dec. 28, 2011

(86) PCT No.: PCT/US2011/067465
§ 371 (c)(1),
(2), (4) Date: Apr. 5, 2013

(87) PCT Pub. No.: WO2012/092314
PCT Pub. Date: Jul. 5, 2012

(65) Prior Publication Data
US 2013/0201861 A1    Aug. 8, 2013

Related U.S. Application Data

(60) Provisional application No. 61/427,905, filed on Dec. 29, 2010.

(51) Int. Cl.
*H04W 24/08* (2009.01)
*H04W 28/20* (2009.01)
*H04W 28/08* (2009.01)

(52) U.S. Cl.
CPC .......... *H04W 24/08* (2013.01); *H04W 28/20* (2013.01); *H04W 28/08* (2013.01)

(58) Field of Classification Search
CPC ..... H04W 72/02; H04W 24/00; H04W 84/12; H04W 28/08; H04W 28/20; H04W 36/06;
(Continued)

(56) References Cited

U.S. PATENT DOCUMENTS 5,521,906 A    5/1996 Grube et al.
5,533,008 A    7/1996 Grube et al.
(Continued)

FOREIGN PATENT DOCUMENTS

EP    0941000 A2    9/1999

OTHER PUBLICATIONS

"On the Capacity of OFDM-Based Spatial Multiplexing Systems," Bolcskei, Helmut, et al., IEEE Transactions on Communications, vol. 50, No. 2 Feb. 2002, pp. 225-234.*
(Continued)

*Primary Examiner* — Charles C Jiang
*Assistant Examiner* — Rose Clark
(74) *Attorney, Agent, or Firm* — McClure, Qualey & Rodack, LLP (57) ABSTRACT

A method for determining a loading of a wideband communications channel in a wireless communications system includes: setting up a loading table for the wideband communications channel comprising a plurality of narrow band communications channels; obtaining channel characteristics of the plurality of narrow band communications channels; deciding on a number of data streams and a practical bandwidth of the wideband communications channel for a data transmission transaction and selecting one or more peer communications devices for receiving the data streams; completing the data transmission transaction with the one or more peer communications devices; updating the loading table with the information about the practical bandwidth of the wideband communications channel, the number of data
(Continued)

streams and duration of the data transmission transaction; and computing the loading by using the information in the loading table in accordance with a pre-determined formula.

19 Claims, 3 Drawing Sheets

(58) Field of Classification Search
CPC ............ H04W 48/08; H04W 72/0406; H04W 72/082; H04W 72/04; H04W 72/0453; H04W 74/0816; H04W 84/18; H04W 16/14; H04W 36/30; H04W 24/08; H04W 24/10; H04W 28/18; H04W 72/085; H04W 72/046; H04W 72/0486; H04W 72/1252; H04L 29/06; H04L 65/604; H04L 69/14; H04L 29/06027; H04L 27/2601; H04L 1/0026; H04L 5/0007; H04L 5/0094; H04B 7/0632; H04B 7/066; H04B 17/309; H04B 7/024; H04B 7/0413; H04B 7/0452
USPC ............... 370/329, 252, 310; 455/422.1, 509
See application file for complete search history.

(56) References Cited

U.S. PATENT DOCUMENTS

| | | | |
|---|---|---|---|
| 5,682,419 A | 10/1997 | Grube et al. | |
| 6,826,160 B1* | 11/2004 | Wang | H04W 28/20 370/329 |
| 2001/0055285 A1 | 12/2001 | Tomoike | |
| 2002/0119781 A1* | 8/2002 | Li | H04L 1/0003 455/450 |
| 2003/0058796 A1 | 3/2003 | Anderson, Sr. | |
| 2003/0198200 A1 | 10/2003 | Diener et al. | |
| 2005/0044127 A1 | 2/2005 | Jaiswal et al. | |
| 2005/0088959 A1* | 4/2005 | Kadous | 370/208 |
| 2005/0130684 A1* | 6/2005 | Kim et al. | 455/464 |
| 2006/0063490 A1 | 3/2006 | Bader et al. | |
| 2006/0140290 A1* | 6/2006 | Li | H04B 7/04 375/260 |
| 2006/0146725 A1* | 7/2006 | Li | H04B 7/0617 370/252 |
| 2007/0076728 A1 | 4/2007 | Rieger et al. | |
| 2007/0081491 A1* | 4/2007 | Kim | H04L 5/0007 370/329 |
| 2008/0075033 A1* | 3/2008 | Shattil | H04B 7/026 370/328 |
| 2008/0159210 A1* | 7/2008 | Zaks et al. | 370/329 |
| 2008/0273591 A1 | 11/2008 | Brooks et al. | |
| 2009/0092051 A1 | 4/2009 | Miyata | |
| 2009/0154927 A1* | 6/2009 | Oksman | H04L 5/0037 398/76 |
| 2009/0310700 A1 | 12/2009 | Liu et al. | |
| 2010/0048148 A1 | 2/2010 | Dietrich | |
| 2011/0134831 A1* | 6/2011 | Pirskanen | H04L 5/001 370/328 |
| 2012/0170507 A1* | 7/2012 | Sawai | H04B 7/0413 370/315 |

OTHER PUBLICATIONS

International Search Report and Written Opinion for PCT/US2011/067465.

* cited by examiner

METHODS FOR DETERMINING A LOADING OF A WIRELESS COMMUNICATIONS SYSTEM AND COMMUNICATION APPARATUSES UTILIZING THE SAME

CROSS REFERENCE TO RELATED APPLICATIONS

This application is a national phase of PCT/US2011/067465 filed Dec. 28, 2011, which claims the benefit of U.S. Provisional Application No. 61/427,905 filed 2010 Dec. 29 and entitled "The method and system for determining the loading of a wireless communications system". The entire contents of which are hereby incorporated by reference.

BACKGROUND OF THE INVENTION

Field of the Invention

The invention relates to a method and system for determining the loading of a wireless communications system.

Description of the Related Art

A conventional wired or wireless communications system has a fixed channel bandwidth and only one data stream is transported over a communication channel at a time. The loading of the communications system is defined by the utilization of the fixed communication channel. The loading of the communications system is a useful indicator of the available communication resources of the communications system.

However, along with the advancements in channel coding, signal processing and antenna technology, the loading obtained based on the utilization of the fixed communication channel as the conventional method is not enough to describe the actual loading of the communications system. Therefore, a novel method and system for determining the loading of a wireless communications system is highly required.

BRIEF SUMMARY OF THE INVENTION

Methods for determining the loading of a wideband communications channel in a wireless communications system are provided. An embodiment of a method for determining the loading of a wireless communications system comprises: setting up a loading table for the wideband communications channel comprising a plurality of narrow band communications channels; obtaining channel characteristics of the plurality of narrow band communications channels; deciding on a number of data streams and a practical bandwidth of the wideband communications channel for a data transmission transaction and selecting one or more peer communications devices for receiving the data streams; completing the data transmission transaction with the one or more peer communications devices; updating the loading table with the information about the practical bandwidth of the wideband communications channel, the number of data streams and duration of the data transmission transaction, and computing the loading by using the information in the loading table in accordance with a pre-determined formula.

Another embodiment of a method for determining a loading of a wireless communications system comprises: obtaining channel characteristics of a plurality of narrow band communications channels; deciding on a practical bandwidth of a wideband communications channel comprising the plurality of narrow band communications channels for a data transmission according to the channel characteristics; deciding on a number of data streams and selecting one or more peer communications devices for receiving the data streams; completing the data transmission transaction with the one or more peer communications devices; and computing the loading by using the information about the practical bandwidth of the wideband communications channel, the number of data streams and duration of the data transmission transaction.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
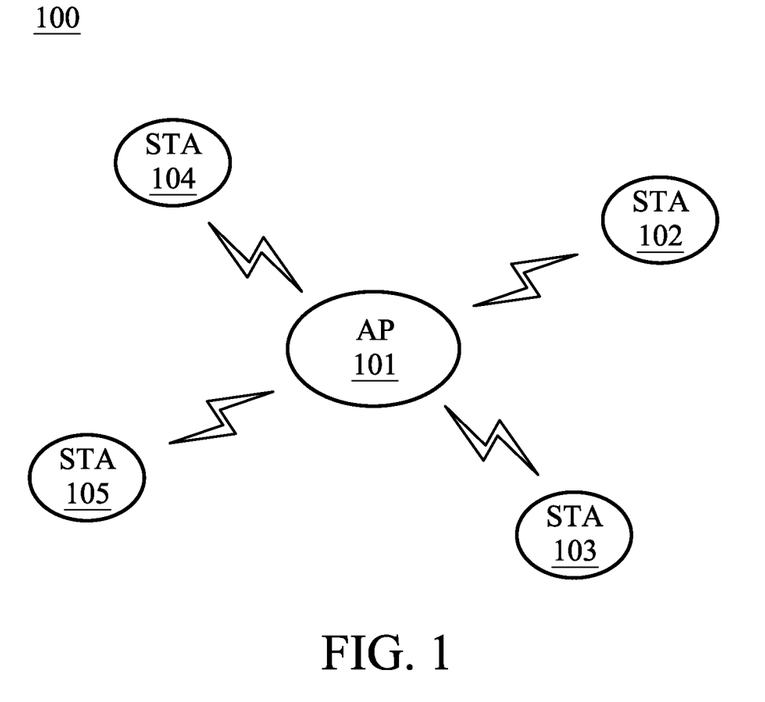
FIG. 1 shows an exemplary communications system according to an embodiment of the invention.

FIG. 1 shows an exemplary communications system according to an embodiment of the invention. The communications system 100 may comprise at least an access point (AP) 101 and one or more stations (STA) 102, 103, 104 and/or 105. The station may be any kind of communications device that is capable of communicating with the access point 101, for example, the station may be a cell phone, a tablet computer, a laptop computer, a notebook, a Global Positioning System (GPS) receiver, a portable gaming device, or others. The access point together with all associated station(s) is called a basic service set (BSS), and the coverage of an access point is called a basic service area (BSA). An access point acts as a master to control the station(s) within a BSS. Each BSS is identified by a BSSID. The most basic BSS consists of one access point and one station.

Figure 2:
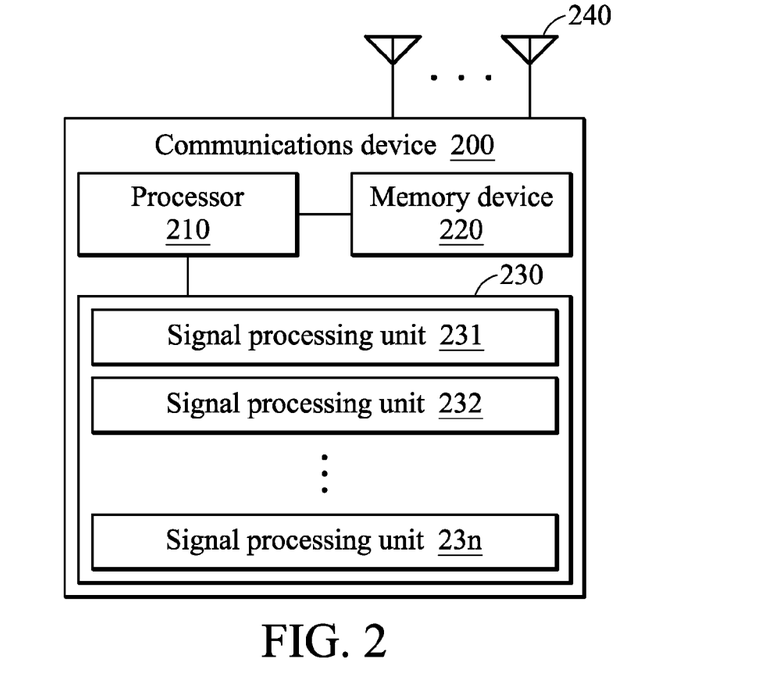
FIG. 2 shows a simplified block diagram illustrating a communications device according to an embodiment of the invention.

FIG. 2 shows a simplified block diagram illustrating a communications device according to an embodiment of the invention. The communications device 200 may be an access point in the communications system, and may comprise at least a processor 210, a memory device 220, a signal processing module 230 and an antenna array 240. The processor 210 controls the operation of the memory device 220, the signal processing module 230, the antenna array 240 and other functional components (not shown). According to an embodiment of the invention, the communications device 200 equipped with multiple antennas in the antenna array 240 may support multiple-input multiple-output antennas (MIMO) technologies and accordingly, the signal processing module 230 may comprise a chain of signal processing units 231, 232 . . . 23n, each being coupled to one antenna and together forming a signal processing and transceiving path.

According to an embodiment of the invention, each signal processing unit may comprise at least a baseband module and a radio frequency (RF) module. The baseband module may comprise multiple hardware devices to perform baseband signal processing, including Analog to Digital Conversion (ADC)/Digital to Analog Conversion (DAC), gain adjusting, modulation/demodulation, encoding/decoding, and so on. The RF module may receive RF wireless signals, convert the received RF wireless signals to baseband signals, which are processed by the baseband module, or receive baseband signals from the baseband module and convert the received baseband signals to RF wireless signals, which are later transmitted. The RF module may also comprise multiple hardware devices to perform signal transceiving and radio frequency conversion. For example, the RF module may comprise a transceiver for transceiving RF wireless signals and a mixer (not shown) to multiply the baseband signals with a carrier oscillated in the radio frequency of the wireless communications system.

Figure 3:
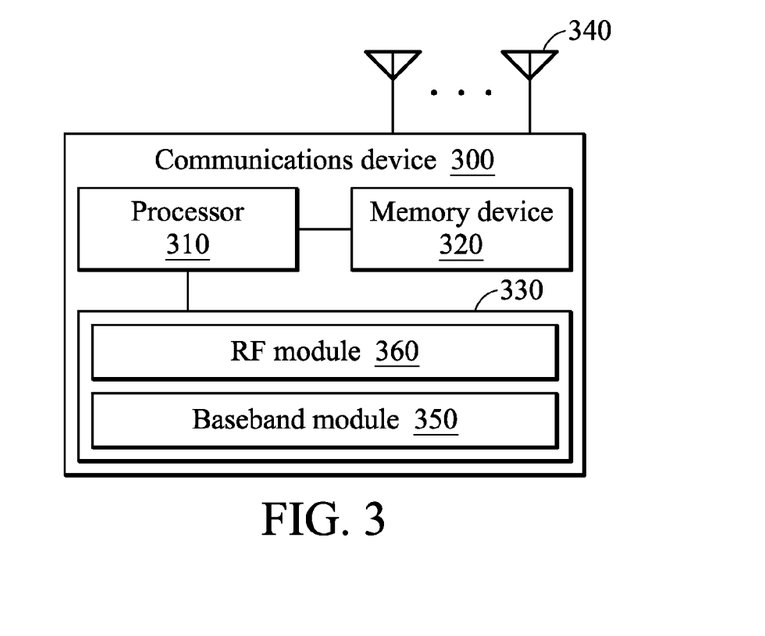
FIG. 3 shows a simplified block diagram illustrating a communications device according to another embodiment of the invention.

FIG. 3 shows a simplified block diagram illustrating a communications device according to another embodiment of the invention. The communications device 300 may be a station in the communications system, and may comprise at least a processor 310, a memory device 320, a signal processing unit 330 and an antenna 340. The processor 310 controls the operation of the memory device 320, the signal processing unit 330, the antenna 340 and other functional components (not shown). According to an embodiment of the invention, the antenna 340 may also be an antenna array when the communications device 300 is an multi-user (MU) capable station and also supports multiple-input multiple-output antennas (MIMO) technologies.

The signal processing unit 330 may comprise at least a baseband module 350 and a radio frequency (RF) module 360. The baseband module 350 may comprise multiple hardware devices to perform baseband signal processing, including Analog to Digital Conversion (ADC)/Digital to Analog Conversion (DAC), gain adjusting, modulation/demodulation, encoding/decoding, and so on. The RF module 360 may receive RF wireless signals, convert the received RF wireless signals to baseband signals, which are processed by the baseband module, or receive baseband signals from the baseband module and convert the received baseband signals to RF wireless signals, which are later transmitted. The RF module 360 may also comprise multiple hardware devices to perform signal transceiving and radio frequency conversion. For example, the RF module 360 may comprise a transceiver for transceiving RF wireless signals and a mixer (not shown) to multiply the baseband signals with a carrier oscillated in the radio frequency of the wireless communications system.

Advances in the channel coding, signal processing, antenna technology, and the ability to adjust channel width dynamically increase the capacity of a wired and wireless communication channel. For example, combining more than one narrow band communications channel into a wider communications channel is one way to increase the capacity of a communications system. The multiple narrow band communications channels bonded together need not be contiguous in frequency.

However, due to unanticipated interferences, not all of the narrow band communications channels in a communications system can be utilized. The interferences can be due to neighboring networks or other unanticipated radiation source transmitting signals in the channel. Blindly combining clear channels with severely interfered channels together may do more harm than good to the throughput of the communications system. The ability to dynamically adjust the channel bandwidth based on the channel characteristic provides a wireless communications system the ability to make the most out of the wider channel bandwidth.

In one preferred embodiment, a set of narrow band channels selected from all available narrow band channels of a regulatory domain in accordance with a pre-determined rule are bonded together. The bonded wideband channel maintains backward compatibility with legacy systems, and complies with operational constraints. The signal format adopted in such a system is designed in a way that incremental bandwidth increases can be easily realized. One example is the use of an OFDM waveform which consists of a number of modulated frequency tones. By increasing the number of frequency tones to fill in the available channel bandwidth, the signal bandwidth can be increased.

The narrow band channels can be bonded statically or dynamically. For dynamic channel bonding, an embodiment of the pre-determined rule is to use a carrier-sensing (CS) technique to detect idle narrow band channels before a data transmission transaction. The CS mechanism distinguishes between the available channel bandwidth (number of available narrow band channels) and the actual transmission bandwidth (number of usable narrow band channels) that may be constrained by the capability of the communication device. Another embodiment of the pre-determined rule is to use a handshaking protocol such as RTS/CTS (Request-to-Send and Clear-to-Send) to acquire the one or more narrow band channels. Additionally, the header portion of a data packet can carry information about the transmission bandwidth. The receiver of the data packet can dynamically process the received signal and determine the width of the channel transporting the data packet.

In addition, exploiting spatial diversity with more than one antenna is another way to increase the capacity of a wireless communications system. A communications device equipped with more than one antenna can transmit more than one data stream to one or more peer communications devices. A preferred embodiment of the invention is to employ an access point (AP) with a higher number of antennas and more advanced signal processing capabilities to process more spatial streams, which serves a number of mobile devices each with reduced number of antennas and signal processing capabilities in a wireless communications system. The preferred embodiment employs MU-MIMO (Multi-user Multiple-in and Multiple-out) techniques to allow the access point (AP) to simultaneously deliver one or more spatial streams to more than one mobile device. In the preferred embodiment, the total number of spatial streams utilized by the access point (AP) can be constrained by the amount of buffered data traffic streams in the access point (AP) and constrained by the capability of the mobile devices. Thus, the spatial resources of the system might not be fully utilized. The utilization of spatial resource within a wireless communications system is generally orthogonal to the frequency resource, i.e., available channels can be fully utilized but spatial resources is underutilized, and vice versa.

Figure 4:
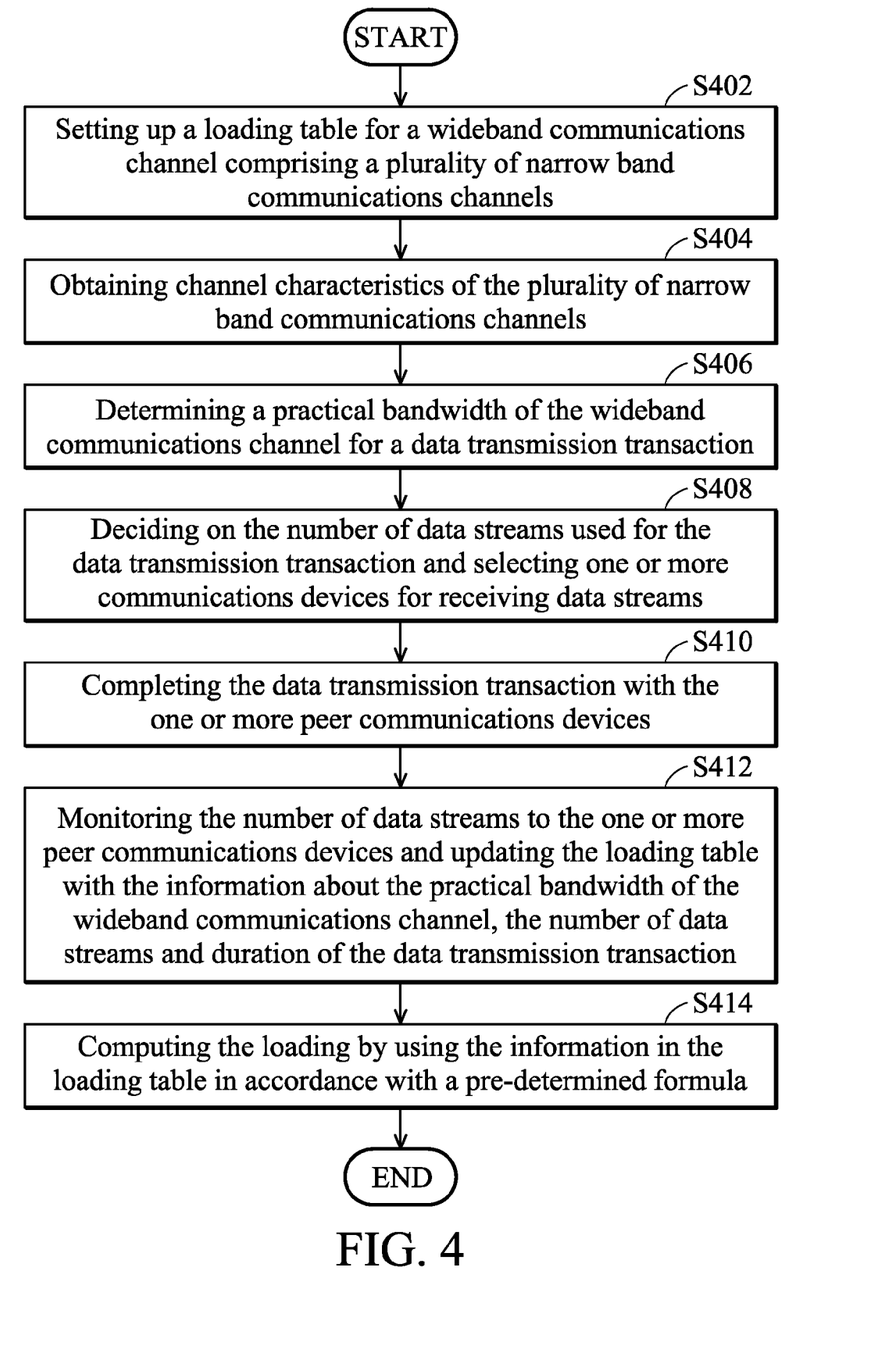
FIG. 4 shows a flow chart of a method for determining a loading in a wireless communications system according to an embodiment of the invention.

In this invention, a method and system to determine the loading of a communications system incorporating the new channel bonding and MIMO techniques are provided. FIG. 4 shows a flow chart of a method for determining the loading in a wireless communications system according to an embodiment of the invention. In this embodiment, the method is performed by a communications device equipped with more than one antenna (e.g. an access point). To begin, the communications device equipped with more than one antenna may set up a loading table for a wideband communications channel comprising a plurality of narrow band communications channels (Step S402). The loading table may be stored in, for example and not limited to, the memory device 220 as shown in FIG. 2. As previously described, multiple narrow band communications channels may be combined into a wider communication channel to increase the capacity of the communications system, and the narrow band communications channels bonded together need not be contiguous in frequency. According to an embodiment of the invention, the loading table is at least comprised of the following entries, practical channel width of a wideband communications channel, number of spatial data streams, and duration of a data transmission transaction. Within the duration indicated by the Duration field, a record of the channel load is stored at either regular intervals during the indicated duration or whenever the configuration of the wideband channel changes Next, the communications device equipped with more than one antenna may obtain channel characteristics of the plurality of narrow band communications channels (Step S404). The channel characteristics may include the channel bandwidth, the channel conditions, channel delay spread, channel coherent time, and others. The communications device equipped with more than one antenna may obtain channel characteristics of the plurality of narrow band communications channels in accordance with a first pre-determine rule. According to an embodiment of the invention, the first pre-determine rule may be receiving explicit information about each of the plurality of narrow band communications channels from one or more peer communications devices via feedback data. Here, the one or more peer communications devices may be the stations in the wireless communications system. The one or more peer communications devices may transmit information about the number of channels that can be supported and the channel conditions via the feedback data to the communications device. According to another embodiment of the invention, the first pre-determine rule may also be deducing the channel characteristic of each narrow band communications channel from the data received from the one or more communications devices. For example, the communications device may deduce the signal to noise ratio (SNR) or received signal strength indicator (RSSI) from the data received from the one or more communications devices.

Next, the communications device equipped with more than one antenna may determine a practical bandwidth of the wideband communications channel for a data transmission transaction (Step S406). The practical wideband communications channel is composed of a subset of narrow band communication channel(s) selected from a plurality of narrow band channels in accordance with a second pre-determined rule. According to an embodiment of the invention, the second pre-determined rule may be selecting one or more narrow band communications channels with the lowest level of interference from the plurality of narrow band communications channels before initiating a data transmission transaction. The one or more narrow band communications channels may be selected based on the clear channel assessment (CCA) mechanism. According to another embodiment of the invention, the second pre-determined rule may also be to sense one or more narrow band communications channels with the lowest level of interference from the plurality of narrow band communications channels in a pre-determined interval. The one or more narrow band communications channels may be sensed based on a constant sensing mechanism. According to yet another embodiment of the invention, the second pre-determined rule may also be to detect whether each of the plurality of the narrow band communications channels of the practical wideband communications channel is clear. According to yet another embodiment of the invention, the wideband communications channel may also be acquired by soliciting information from the peer communications device participating in data exchange transactions. For example, the communications device equipped with more than one antenna may obtain the information by using a handshaking protocol.

Next, the communications device equipped with more than one antenna may decide on the number of data streams used for the data transmission transaction and selects one or more communications devices for receiving data streams (Step S408). According to an embodiment of the invention, the communications device may decide on the number of data streams used for the data transmission transaction and selects one or more peer communications devices for receiving data streams according to the number of antenna equipped in the one or more peer communications devices, the location of the one or more peer communications devices, the channel characteristics obtained in step S404, the number of peer communications devices that have requested for the data, or others. According to another embodiment of the invention, the number of data streams is decided and the one or more peer communications devices is selected in accordance with a grouping rule. For example, the grouping rule is to find a grouping that has the best utilization of the practical wideband communications channel. For another example, the grouping rule is to find a first grouping that fits in the practical bandwidth of the wideband communications channel.

Next, the communications device equipped with more than one antenna may complete the data transmission transaction with the one or more peer communications devices (Step S410). Next, the communications device equipped with more than one antenna monitors the number of data streams to the one or more peer communications devices and updates the loading table with the information about the practical bandwidth of the wideband communications channel, the number of data streams and duration of the data transmission transaction (Step S412). Finally, the communications device equipped with more than one antenna may compute the loading by using the information in the loading table in accordance with a pre-determined formula (Step S414).

In one embodiment, the loading of communications system comprises the loading for single user (SU) operation and loading for multi-user (MU) operation. The loading of SU operation is computed by using the algorithms that a person having ordinary skill in the art would know. The loading of MU-MIMO operation further comprises a spatial stream loading. The spatial stream loading is computed according to the following equation:

$$SSL(\text{Spatial Stream Loading}) = \text{SUM}(T_i * S_i) / (\text{SUM}(T_i) * S_{max}), \qquad \text{Eq. (1)}$$

where i is a positive integer and $i=1 \ldots n$, $S_{max}$ is the maximum number of streams supported by a communications device during a chosen monitor time L, L, for loading calculation, is divided into n sequential periods denoted by $T_i$, where $\text{SUM}(T_i)=L$ and $\text{SUM}(T_i * S_i)$ is a summation of $T_i * S_i$ over the $i=1 \ldots n$, and $S_i$ is the number of spatial streams transmitted by the communications device in time period $T_i$.

According to an embodiment of the invention, the loading may be computed by calculating a combined result of the amount of Channel Utilization (CU) and the amount of spatial resource utilization. In the embodiment, the channel utilization of each primary channel may be determined by using CCA sensing mechanism and based on that the Average Available BW Utilization (AABU) may be determined. An example of channel utilization in a BSS having a maximum 80 MHz of transmission bandwidth may be obtained according to the equation (1) as shown below:

$$\text{Total CU} = CU_{Primary\ 0\ MHz} + CU_{Primary\ 20\ MHz} + CU_{Primary\ 40\ MHz} + CU_{Primary\ 80\ MHz} \quad \text{Eq. (2)}$$

where $CU_{Primary\ xx\ Mhz}$ is the CU while xx MHz BW of the primary channel is available. The Average Available BW Utilization (AABU) may further be determined according to the equation (2) as shown below:

$$AABU = (20\ MHz * CU_{Primary\ 20\ Mhz} + 40\ MHz * CU_{Primary\ 40\ Mhz} + 80\ MHz * CU_{80\ MHz}) / \text{Total CU} \quad \text{Eq. (3)}$$

In addition, the spatial resource utilization may be determined based on the number of used and unused spatial streams (SS). An Averaged Unused Spatial Streams (AUSS) may be determined according to the equation (3) shown below:

$$AUSS = \text{Total SS Supported} - \text{Average Downlink SS} \quad \text{Eq. (4)}$$

where the "Total SS Supported" is the total number of spatial streams (for example, the total number of spatial resources or antennas, where each spatial resource or antenna may be capable of transmitting a spatial stream (that is, the data stream)) that can be supported by the communications device, and the Average Downlink SS is the average number of spatial streams practically used for downlink transmission. Finally, the loading of the communications system may be obtained based on the equation (4) as shown below:

$$\text{Unused Spatial Resource} = (\text{Total CU} - CU_{Primary\ 0\ Mhz}) * AUSS \quad \text{Eq. (5)}$$

According to another embodiment of the invention, the loading may be obtained by individually considering the amount of channel utilization and the amount of spatial resource utilization. In the embodiment, the channel utilization of each primary channel may be determined by the percentage of time that the primary channel is busy according to the equation (5) as shown below:

$$\text{Utilization}_{xx\ Mhz} = T_{xx\ Mhz,\ busy} / T_{busy} \quad \text{Eq. (6)}$$

where $\text{Utilization}_{xx\ Mhz}$ is the utilization of the xx MHz BW of the primary channel, $T_{xx\ Mhz,\ busy}$ is the time during which the xx MHz BW of the primary channel is busy, and the $T_{busy}$ is the time during which the communications device is transmitting one or more spatial streams.

In addition, the spatial resource utilization of each spatial resource may be determined according to the equation (6) as shown below:

$$\text{Utilization}_{SR(x)} = T_{SR(x),\ busy} / T_{busy} \quad \text{Eq. (7)}$$

where $\text{Utilization}_{SR(x)}$ is the utilization of the x-th spatial resource, $T_{SR(x),\ busy}$ is the time during which the x-th spatial resource is busy, and the $T_{busy}$ is the time during which the communications device is transmitting one or more spatial streams. The loading of the communications system may further be obtained individually considering the amount of channel utilization for each primary channel and the amount of spatial resource utilization for each spatial resource obtained based on Eq. (5) and Eq. (6). As one of ordinary skill in the art will readily appreciate, there are still plenty of ways to compute the loading of the communications system according to the frequency domain information (for example, the channel utilization), the spatial domain information (for example, the spatial resource utilization), and the time domain information (for example, the time during which the communications device is transmitting one or more spatial stream), and the invention scope should not be limited to the equations as described above.

After determining the loading of the communications system, the loading information may be transmitted by the communications device equipped with more than one antenna (e.g. the access point) to one or more peer communications devices (e.g. the stations), so that the peer communications devices may determine whether to join the grouping of the communications system or not according to the loading information. Based on the concept of the invention, because the loading of the communications system may be computed according to the frequency domain information, the spatial domain information and/or the time domain information, the actual loading of the communications system is revealed. In addition, the peer communications devices (e.g. the stations) can find a grouping that has the best utilization of the wideband communications channel and the transmission throughput can be optimized.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for determining a loading of a wideband communications channel in a wireless communications system comprising:
   setting up a loading table for the wideband communications channel comprising a plurality of narrow band communications channels, wherein the plurality of narrow band communications channels are bonded together to form the wideband communications channel;
   obtaining channel characteristics of the plurality of narrow band communications channels;
   determining a bandwidth of the wideband communications channel for a data transmission transaction according to the channel characteristics of the plurality of narrow band communications channels, wherein one or more narrow band communications channels with the lowest level of interference are selected from the plurality of narrow band communications channels;
   deciding on a number of data streams used for the data transmission transaction and selecting one or more peer communications devices for receiving the data streams;

completing the data transmission transaction with the one or more peer communications devices;

updating the loading table with the information about the bandwidth of the wideband communications channel, the number of data streams and duration of the data transmission transaction;

computing the loading of the wideband communications channel by using the information in the loading table in accordance with a pre-determined formula; and transmitting the loading of the wideband communications channel to one or more peer communications devices.

2. The method as claimed in claim 1, wherein the bandwidth of the wideband communication channel is composed of a subset of narrow band communications channel(s) selected from the plurality of narrow band communications channels in accordance with a channel selection rule.

3. The method as claimed in claim 2, wherein the channel selection rule uses the channel characteristics of the plurality of the narrow band communications channels to make the selection.

4. The method as claimed in claim 2, wherein the channel characteristics of the plurality of the narrow band communications channels comprise a signal to noise ratio, channel delay spread and/or channel coherent time.

5. The method as claimed in claim 1, wherein the number of data streams is decided and the one or more peer communications devices is selected in accordance with a grouping rule.

6. The method as claimed in claim 5, wherein the grouping rule is to find a grouping that has the best utilization of the wideband communications channel according to the information stored in the loading table.

7. The method as claimed in claim 5, wherein the grouping rule is to find a grouping that fits in the bandwidth of the wideband communications channel.

8. The method as claimed in claim 1, wherein the loading of the wideband communications channel is computed according to the following equation:

$$SSL(\text{Spatial Stream Loading}) = SUM(T_i * S_i) / (SUM(T_i) * Smax),$$

wherein i is a positive integer and i=1 . . . n, Smax is a maximum number of data streams supported by a communications device during a chosen monitor time L, L is divided into n sequential periods denoted by $T_i$, where SUM $(T_i)$=L and SUM$(T_i*S_i)$ is a summation of $T_i*Si$ over the i=1 . . . n, and Si is a number of spatial streams transmitted by the communications device in time period $T_i$.

9. A method for determining a loading of a wireless communications system comprising:

obtaining channel characteristics of a plurality of narrow band communications channels, wherein the plurality of narrow band communications channels are bonded together to form a wideband communications channel;

deciding on a bandwidth of the wideband communications channel for a data transmission according to the channel characteristics of the plurality of narrow band communications channels, wherein one or more narrow band communications channels with the lowest level of interference are selected from the plurality of narrow band communications channels;

deciding on a number of data streams and selecting one or more peer communications devices for receiving the data streams;

completing the data transmission transaction with the one or more peer communications devices;

computing the loading by using the information about the bandwidth of the wideband communications channel, the number of data streams and duration of the data transmission transaction; and transmitting the loading of the wideband communications channel to one or more peer communications devices.

10. The method as claimed in claim 9, further comprising:

storing the information about the bandwidth of the wideband communications channel, the number of data streams and the duration of the data transmission transaction in a loading table for the wideband communications channel.

11. The method as claimed in claim 9, wherein the bandwidth of the wideband communication channel is composed of a subset of narrow band communications channel(s) selected from the plurality of narrow band communications channels in accordance with a channel selection rule.

12. The method as claimed in claim 11, wherein the channel selection rule uses the channel characteristics of the plurality of the narrow band communications channels to make the selection.

13. The method as claimed in claim 11, wherein the channel characteristics of the plurality of the narrow band communications channels comprise a signal to noise ratio, channel delay spread and/or channel coherent time.

14. The method as claimed in claim 9, wherein the number of data streams is decided and the one or more peer communications devices is selected in accordance with a grouping rule.

15. The method as claimed in claim 14, wherein the grouping rule is to find a grouping that has the best utilization of the wideband communications channel.

16. The method as claimed in claim 14, wherein the grouping rule is to find a grouping that fits in the bandwidth of the wideband communications channel.

17. The method as claimed in claim 9, wherein the loading is computed according to the following equation:

$$SSL(\text{Spatial Stream Loading}) = SUM(T_i * S_i) / (SUM(T_i) * Smax),$$

wherein i is a positive integer and i=1 . . . n, Smax is a maximum number of data streams supported by a communications device during a chosen monitor time L, L is divided into n sequential periods denoted by $T_i$, where SUM $(T_i)$=L and SUM$(T_i*S_i)$ is a summation of $T_i*Si$ over the i=1 . . . n, and Si is a number of spatial streams transmitted by the communications device in time period $T_i$.

18. The method as claimed in claim 1, wherein if a maximum transmission bandwidth is 80 MHz, an Average Available Bandwidth Utilization (AABU) is determined according to $$AABU = (20\ MHz * CU_{Primary\ 20\ MHz} + 40\ MHz * CU_{Primary\ 40\ MHz} + 80\ MHz * CU_{80\ MHz}) / \text{Total CU}$$

Wherein Total CU is total channel utilization in a basic service set, $CU_{Primary\ 20\ MHz}$ is the channel utilization while 20 MHz bandwidth of the primary channel is available, $CU_{Primary\ 40\ MHz}$ is the channel utilization while 40 MHz bandwidth of the primary channel is available, and $CU_{Primary\ 80\ MHz}$ is the channel utilization while 80 MHz bandwidth of the primary channel is available.

19. The method as claimed in claim 9, wherein if a maximum transmission bandwidth is 80 MHz, an Average Available Bandwidth Utilization (AABU) is determined according to $$AABU = (20\text{ MHz} * CU_{Primary\ 20\ Mhz} + 40\text{ MHz} * CU_{Primary\ 40\ Mhz} + 80\text{MHz} * CU_{80\ MHz}) / \text{Total CU}$$

Wherein Total CU is total channel utilization in a basic service set, $U_{Primary\ 20\ Mhz}$ is the channel utilization while 20 MHz bandwidth of the primary channel is available, $CU_{Primary\ 40\ Mhz}$ is the channel utilization while 40 MHz bandwidth of the primary channel is available, and $CU_{Primary\ 80\ Mhz}$ is the channel utilization while 80 MHz bandwidth of the primary channel is available.

* * * * *